Feb. 27, 1940.  E. J. SIMANEK  2,192,157
BRAKE ARRANGEMENT FOR SIX-WHEEL TRUCKS
Filed Nov. 2, 1938  2 Sheets-Sheet 2
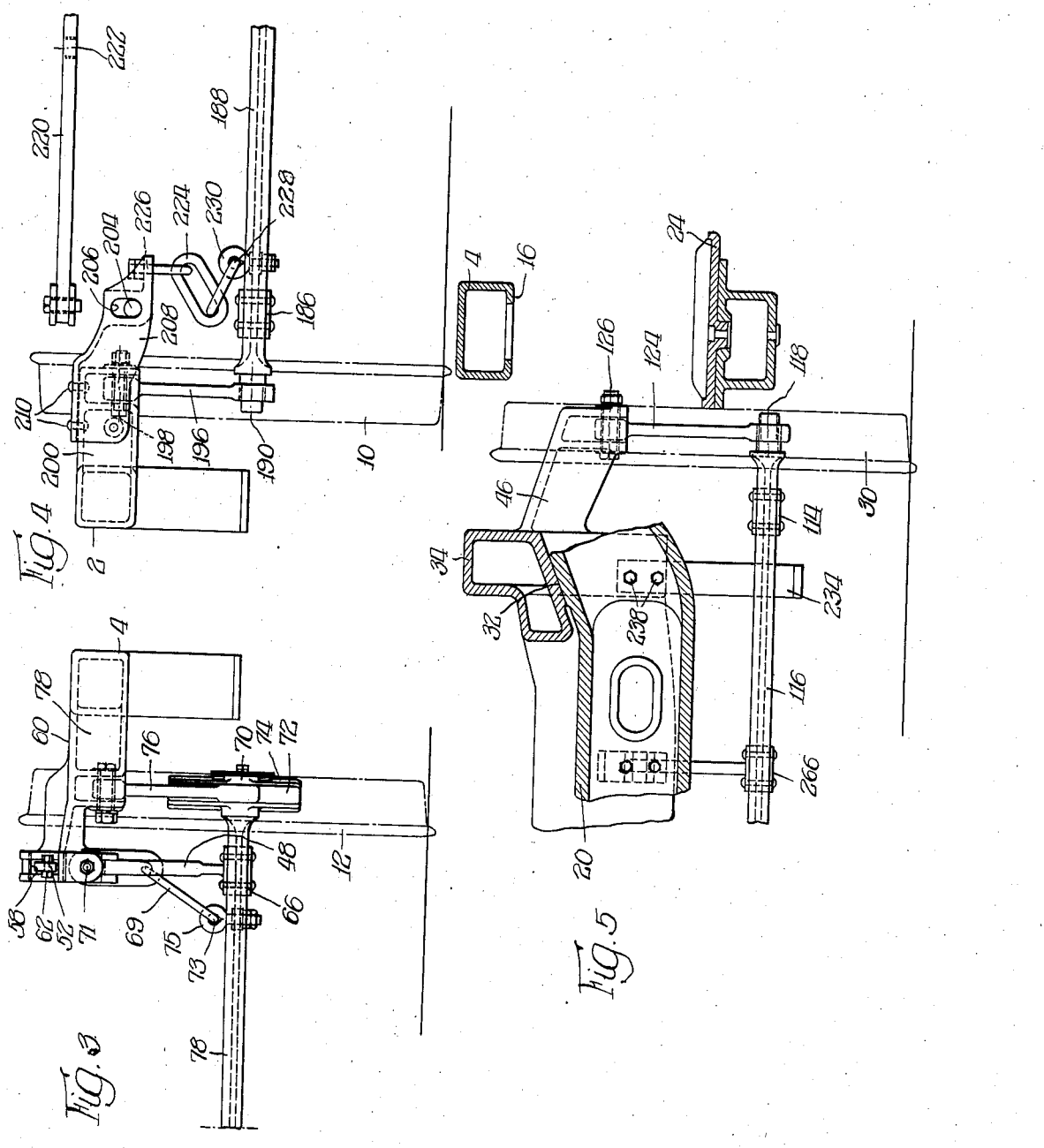
INVENTOR.
Edward J. Simanek,
BY
ATTORNEY.

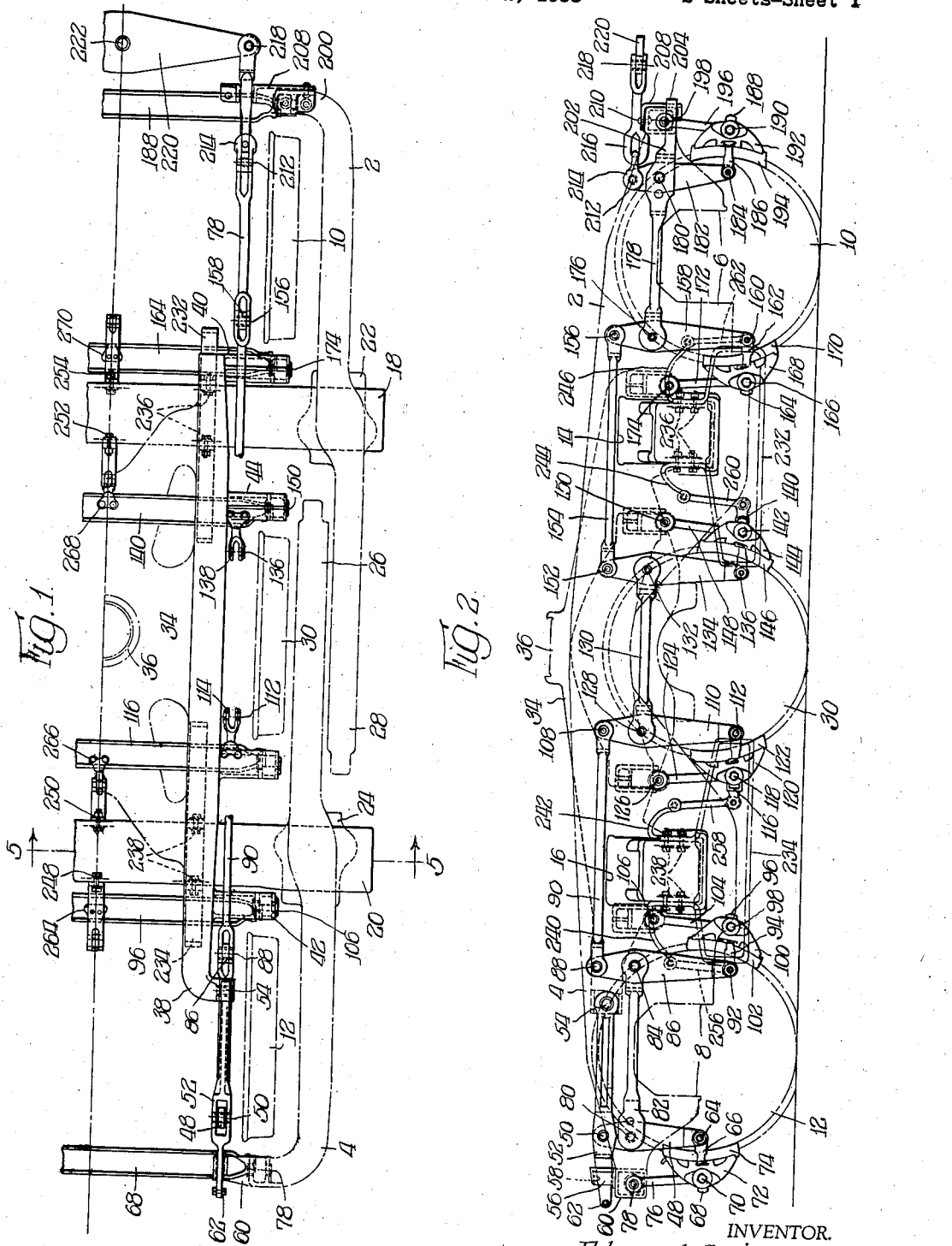

Patented Feb. 27, 1940

2,192,157

UNITED STATES PATENT OFFICE 2,192,157

BRAKE ARRANGEMENT FOR SIX-WHEEL TRUCKS

Edward J. Simanek, Chicago, Ill., assignor to American Steel Foundries, Chicago, Ill., a corporation of New Jersey Application November 2, 1938, Serial No. 238,355

11 Claims. (Cl. 188—56)

My invention relates to brake rigging for railway car trucks of the type generally designated clasp brakes wherein brake heads and brake shoes are supported for engagement with opposite sides of each wheel.

In modern truck development wherein a great variety of car body conditions prevail, it is impracticable at times to support the brake rigging from the side frame members as is commonly the case. Under such circumstances it has been known to support the rigging intermediate the wheels from load carrying members extending from side frame to side frame transversely of the truck. Under certain conditions of truck and body construction this arrangement is unsuitable or impracticable and for such structures I have devised the novel arrangement of supporting the brake rigging intermediate the wheels.

My invention contemplates an arrangement wherein clasp brake rigging may be supported on a railway car truck intermediate the wheels thereof from a separate member carried on the transverse load carrying members, sometimes designated transoms.

An object of my invention is to provide an arrangement for supporting the rigging intermediate the wheels which will permit the maximum of clearance longitudinally of the truck, thus avoiding the extension of brake hanger brackets or other brake supporting means in such a manner as to obstruct the entire area between the wheels.

In my novel arrangement I have so positioned the brake supporting brackets off of a central member of the truck structure that they are positioned substantially directly above the brake beams which are supported therefrom thus reducing to a minimum the space occupied by said brackets and at the same time allowing the brake structure to be supported clear of the side frame member except adjacent the ends of the truck.

One modification of my novel brake arrangement is shown in the accompanying drawings wherein certain details may be omitted from one figure where better shown in another figure.

Figure 1 is a top plan view of a truck and brake structure embodying my invention, only one half of the arrangement being shown inasmuch as the structure is the same at both sides of the truck;

Figure 2 is a side elevation of the truck and brake structure shown in Figure 1;

Figure 3 is an end view taken from the left as seen in Figures 1 and 2;

Figure 4 is an end view taken from the right as seen in Figures 1 and 2; and

Figure 5 is a transverse sectional view taken intermediate the wheels at one end of the truck and substantially in the vertical plane indicated by the line 5—5 of Figure 1.

Describing my novel brake arrangement in greater detail, the truck structure comprises the side members 2 and 4 presenting adjacent their ends the column guides 6, 6 and 8, 8 arranged for engagement in the usual manner with journal boxes (not shown) serving as the usual means of connection to the journal portions of the wheel and axle assemblies 10 and 12. Between the wheels the side members 2 and 4 are formed with the window openings 14 and 16 through which may project the transverse load carrying members or transoms 18 and 20, the ends of which may be seated upon spring groups (not shown), said spring groups being seated on spring seats 22 and 24 carried upon said side members beneath said openings in the usual manner. From the window openings 14 and 16 the side members 2 and 4 are extended centrally of the truck as best seen at 26 and 28 (Figure 1), said extended portions being arranged in overlapping relationship longitudinally of the truck and designed to seat upon and interlock with the journal box (not shown) forming a means of connection to the journal portion of the intermediate wheel and axle assembly 30.

Seated upon the transverse load carrying members 18 and 20 in the manner best seen at 32 (Figure 5) is the center bolster or span bolster 34 having the center bearing 36, said span bolster engaging each of said transverse load carrying members at two spaced points positioned somewhat inwardly of the side frames at opposite sides of the truck. Said span bolster has at one end thereof (Figure 1, left) the longitudinally extended brake supporting bracket 38 and also carries at its opposite ends the laterally extending brake supporting brackets 40 and 42 as well as intermediate its ends the laterally extending brake supporting brackets 44 and 46.

The said laterally extending brake supporting brackets are mounted on said span bolster in such manner as to support the brake hangers in close proximity to the adjacent wheels permitting a maximum of clearance. Describing the brake arrangement in detail, it comprises the dead truck lever 48 (Figures 1 and 2, left) pivotally supported in a well known manner at its upper end as at 50 from the compression bar 52, the inner end of said compression bar having a pivotal connection as at 54 from the before mentioned end bracket 38 and having a sliding connection as at 56 in the slot 58 provided at the extremity of the in-turned bracket 60 integrally formed with the side member 4. Means for retaining the said compression bar 52 within the slot 58 is in the form of a bolt and nut assembly 62 mounted on the end of said compression member externally of said slot. The lower end of the dead truck lever 48 has a pivotal connection as at 64 to the fulcrum 66 mounted on the brake beam 68 adjacent an end thereof, said brake beam carrying on its trunnion end as at 70 the brake head 72 with the associated brake shoe 74 arranged for engagement with the periphery of the adjacent wheel. A safety support for the beam 68 is provided in the form of a chain link 69 (Figure 3) hung as at 71 from the in-turned bracket 60 and connected as at 73 to the eye-bolt 75 secured on said beam. Also connected at the pivotal point 70 is the lower end of the brake hanger 76, the upper end of which is pivotally hung as at 78 from the in-turned bracket 60.

Intermediate the ends of the dead truck lever 48 as at 80 is pivotally and adjustably connected one end of the pull rod 82, the opposite end thereof having a pivotal connection as at 84 to the live truck lever 86, the upper end of which has a pivotal connection as at 88 to the pull rod 90 and the lower end of which has a pivotal connection as at 92 to the fulcrum 94 mounted on the brake beam 96 adjacent an end thereof. Pivotally mounted as at 98 on the trunnion end of the beam 96 is the brake head 100 and the associated brake shoe 102 arranged for engagement with the opposite periphery of the last mentioned wheel. Likewise connected at the pivotal point 98 is the hanger 104, the upper end of which is pivotally hung as at 106 from the extremity of the bracket 42, already described.

The inner end of the pull rod 90 has a pivotal connection as at 108 to the upper end of the live truck lever 110 and the lower end of said live truck lever has a pivotal connection as at 112 to the fulcrum 114 mounted on the beam 116 adjacent an end thereof. On the trunnion end of the beam 116 is pivotally mounted as at 118 the brake head 120 with the brake shoe 122 arranged for engagement with the periphery of the adjacent wheel of the intermediate wheel and axle assembly. Also connected at the pivotal point 118 is the lower end of the hanger 124, the upper end of which has a pivotal connection as at 126 at the extremity of the bracket 46, already described. Intermediate the ends of the live truck lever 110 is pivotally connected as at 128 one end of the pull rod 130, the opposite end thereof having a pivotal connection as at 132 to a point intermediate the ends of the live truck lever 134, the lower end of said live truck lever having a pivotal connection as at 136 to the fulcrum 138 mounted on the beam 140 adjacent an end thereof. Pivotally mounted as at 142 on the trunnion end of the beam 140 is the brake head 144 with the associated shoe 146 arranged to engage the opposite periphery of the last mentioned wheel. Also connected at the pivotal point 142 is the lower end of the hanger 148, the upper end of which is pivotally hung as at 150 from the extremity of the bracket 44, already described.

Pivotally connected as at 152 at the upper end of the live truck lever 134 is the pull rod 154, the opposite end of which has a pivotal connection as at 156 to the live truck lever 158. The lower end of said live truck lever has a pivotal connection as at 160 to the fulcrum 162 secured on the beam 164 adjacent an end thereof. Pivotally mounted as at 166 on the trunnion end of said beam is the brake head 168 carrying the shoe 170 arranged for engagement with the periphery of the adjacent wheel. Also connected at the pivotal point 166 is the lower end of the hanger 172, the upper end of which is pivotally hung as at 174 from the extremity of the bracket 40.

Intermediate the ends of the live truck lever 158 is pivotally connected as at 176 an end of the pull rod 178, said pull rod having adjacent its opposite end a pivotal and adjustable connection as at 180 with a point intermediate the ends of the live truck lever 182, the lower end of said live truck lever having a pivotal connection as at 184 with the fulcrum 186 mounted on the beam 188 adjacent an end thereof. Pivotally carried as at 190 on the trunnion end of the beam 188 is the brake head 192 with the brake shoe 194 arranged for engagement with the opposite periphery of the last mentioned wheel. Also pivotally connected at 190 is the lower end of the hanger 196, the upper end thereof being pivotally hung as at 198 from the in-turned end 200 of the side member 2. The pull rod 178 is extended as at 202 beyond the pivot point 180, said extension being projected as at 204 through the slot 206 formed in the bracket 208, said bracket being secured as at 210, 210 (Figure 4) on the in-turned end 200 of the side frame member 2.

The upper end of the live truck lever 182 has a pivotal connection as at 212 to the clevis means 214, the opposite end of which is connected to the link 216 and the outer end of said link has a pivotal connection as at 218 to the equalizer 220. The mid-point of the equalizer 220 may have a connection as at 222 to brake actuating means mounted on the car body.

Safety means for the end beam 188 is in the form of the chain 224 (Figure 4), the upper end of which is supported as at 226 from the extremity of the bracket 208 and the lower end of which has a connection as at 228 to the eye-bolt 230 mounted on the beam 188.

Safety means for the beams intermediate the wheels are provided in the form of the straps 232 and 234, said straps being supported as at 236, 236 and 238, 238 from the transverse load carrying members 18 and 20 respectively. Balancing means for the brake beams intermediate the wheels is provided by the resilient straps 240, 242, 244 and 246 secured respectively as at 248 and 250 to the transverse load carrying member 20 and as at 252 and 254 to the transverse load carrying member 18. Said resilient straps are pivotally connected respectively to the upper ends of the links 256, 258, 260 and 262, and said links have their lower ends pivotally connected respectively to fulcrums 264, 266, 268 and 270 mounted on the mid-points of adjacent beams 96, 116, 140 and 164 respectively.

In operation, assuming the parts to be in released position, actuation of the equalizer 220 by means of the connection as at 222 moves said equalizer to the right (Figure 2), thus rotating the live truck lever 182 in a clockwise direction about the fulcrum 184 at its lower end and through the several pull rod and lever connections at 180, 176, 156, 152, 132, 128, 108, 88, 84 and 80 such movement is transmitted to the fulcrum point 50 of the compression bar 52 at the opposite end of the truck, thus taking up the slack in the rigging and applying the brake heads and brake shoes at opposite sides of each wheel by the lever action well known in the art. Release of the power means causes the parts to move in directions reverse to those just described, thus releasing the brakes.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car, a frame including side members, transverse load carrying members supported thereon, and a span bolster seated at spaced points on said load carrying members intermediate adjacent wheels, end and intermediate wheel and axle assemblies, pairs of spaced brackets on said bolster between adjacent wheels, the brackets of each pair being positioned on opposite sides of the adjacent load carrying member, other brackets on said load carrying members along the longitudinal center line of said truck, and brake rigging associated with said wheels including brake beams carrying brake heads and brake shoes at opposite sides of each assembly, brake hangers supporting said beams outwardly of the wheels from said side frames, other brake hangers supporting adjacent beams from said brackets intermediate the wheels, and balancing means for said rigging connected to said brackets along the longitudinal center line of said truck, said truck and brake rigging being so constructed and arranged as to afford maximum lateral clearance between said rigging and said side frames intermediate the ends of said side frames.

2. In a railway car, a framework comprising side frames, spaced transverse load carrying members supported from said side frames, and a span bolster seated on said load carrying members intermediate adjacent wheels, end and intermediate wheel and axle assemblies, pairs of spaced lateral brackets on said bolster intermediate adjacent wheels, the brackets of each pair being positioned on opposite sides of the adjacent load carrying member, and other brackets on said load carrying members along the longitudinal center line of said truck, and brake rigging including brake heads and brake shoes supported at opposite sides of each wheel, and comprising live and dead truck levers supported at opposite sides of an end assembly adjacent each wheel thereof, live truck levers supported at opposite sides of said other assemblies adjacent each wheel thereof, pull rods interconnecting said levers, and supporting means for said rigging hung from said side frames at opposite ends of said truck and from said brackets intermediate said assemblies.

3. In a railway car, a framework comprising side frames, spaced transverse load carrying members supported from said side frames, and a span bolster seated on said load carrying members and bearing thereon at spaced points intermediate adjacent wheels, end and intermediate wheel and axle assemblies, pairs of spaced lateral brackets on said bolster intermediate the wheels, the brackets of each pair being positioned on opposite sides of the adjacent load carrying member, and brake rigging including brake heads and brake shoes supported at opposite sides of each wheel and comprising live and dead truck levers supported at opposite sides of an end assembly adjacent each wheel thereof, live truck levers supported at opposite sides of said other assemblies adjacent each wheel thereof, pull rods interconnecting said levers, and supporting means for said rigging hung from said side frames at the opposite ends of said truck and from said brackets intermediate the wheels.

4. In a railway car, a frame including side members, transverse load carrying members supported thereon, and a span bolster seated at spaced points on said load carrying members, end and intermediate wheel and axle assemblies, pairs of spaced brackets on said bolster between adjacent wheels, the brackets of each pair being positioned on opposite sides of the adjacent load carrying member, other brackets on said load carrying members along the longitudinal center line of said truck, and brake rigging associated with said wheels including brake beams carrying brake heads and brake shoes at opposite sides of each assembly, brake hangers supporting said beams outwardly of the wheels from said side frames, other brake hangers supporting adjacent beams from said brackets intermediate the wheels, and balancing means for said rigging connected to said brackets along the longitudinal center line of said truck.

5. In a railway car truck, a frame comprising side members, spaced transverse load carrying members, and a span bolster seated on said load carrying members and bearing thereon at spaced points intermediate adjacent wheels, end and intermediate wheel and axle assemblies, pairs of spaced brackets supported from said bolster intermediate said wheels, the brackets of each pair being positioned on opposite sides of the adjacent load carrying member, brake rigging comprising brake beams supporting brake heads and brake shoes at opposite sides of each wheel, and means at one end of said truck through which said rigging may be actuated, said brake beams being supported outwardly of said wheels from said side members and intermediate said wheels from said brackets, whereby said rigging is spaced from and free of engagement with said side members intermediate the ends thereof.

6. In a railway car truck, a framework including side frames, spaced transverse load carrying members, and a span bolster supported at spaced points intermediate adjacent wheels on said members, end and intermediate wheel and axle assemblies, a plurality of pairs of brackets supported from said bolster intermediate adjacent wheels, the brackets of each pair being positioned on opposite sides of the adjacent point of support, and brake rigging associated with said wheels and comprising brake beams supported on opposite sides of each wheel, said brake beams at the ends of said truck being supported from said side frames and said beams intermediate the wheels being supported from said brackets, whereby said rigging is free of engagement with and spaced from said side frames intermediate the ends of the truck.

7. In a railway car truck, a frame comprising side members, spaced transverse load carrying members, and a span bolster seated at spaced points intermediate adjacent wheels on said load carrying members, end and intermediate wheel and axle assemblies, pairs of spaced brackets supported from said bolster intermediate said wheels, the brackets of each pair being positioned on opposite sides of the adjacent load carrying member, brake rigging comprising brake beams supporting brake heads and brake shoes at opposite sides of each wheel, and means at one end of said truck through which said rigging may be actuated, said brake beams being supported outwardly of said wheels from said side members and intermediate said wheels from said brackets.

8. In a railway car truck, a framework including side frames, spaced transverse load carrying members, and a span bolster supported at spaced points intermediate adjacent wheels on said members, end and intermediate wheel and axle assemblies, pairs of spaced laterally projecting brackets on said bolster intermediate adjacent wheels, one of said brackets being positioned on each side of the adjacent point of support, and clasp brake rigging associated with said wheels, said rigging being supported at the ends of said truck from said side frames and intermediate the wheels from said brackets, whereby said rigging is attached at the ends of said side frames and spaced therefrom intermediate the ends of said frames.

9. In a railway car truck, a framework including side frames, spaced transverse load carrying members, and a span bolster supported at spaced points intermediate adjacent wheels on said members, end and intermediate wheel and axle assemblies, a plurality of pairs of brackets supported from said bolster intermediate adjacent wheels, one of said brackets being positioned on each side of the adjacent point of support, and brake rigging associated with said wheels and comprising brake beams supported on opposite sides of each wheel, said brake beams at the ends of said truck being supported from said side frames and said beams intermediate the wheels being supported from said brackets.

10. In a railway car truck, a framework including side frames, spaced transverse load carrying members, and a span bolster supported at spaced points intermediate adjacent wheels on said members, end and intermediate wheel and axle assemblies, a plurality of pairs of brackets supported from said bolster intermediate adjacent wheels, one of said brackets being positioned on each side of the adjacent point of support, and brake rigging associated with said wheels, said rigging comprising brake beams supported at opposite sides of each wheel and axle assembly, hangers supporting the end beams from said frames, and other hangers supporting beams intermediate the wheels from said brackets.

11. In a railway car truck, a framework including side frames, spaced transverse load carrying members, and a span bolster supported at spaced points intermediate adjacent wheels on said members, end and intermediate wheel and axle assemblies, pairs of spaced laterally projecting brackets on said bolster intermediate said wheels, one of said brackets being positioned on each side of the adjacent point of support, and clasp brake rigging associated with said wheels, said rigging being supported at the ends of said truck from said side frames and intermediate the wheels from said brackets.

EDWARD J. SIMANEK.